US011618109B2

(12) United States Patent
Choi et al.

(10) Patent No.: US 11,618,109 B2
(45) Date of Patent: Apr. 4, 2023

(54) WIRE FOR ELECTRIC BONDING

(71) Applicant: ELECTRONICS AND TELECOMMUNICATIONS RESEARCH INSTITUTE, Daejeon (KR)

(72) Inventors: Gwang-Mun Choi, Daejeon (KR); Yong Sung Eom, Daejeon (KR); Kwang-Seong Choi, Daejeon (KR); Jiho Joo, Daejeon (KR); Chanmi Lee, Daejeon (KR); Ki Seok Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 17/364,128

(22) Filed: Jun. 30, 2021

(65) Prior Publication Data
US 2021/0402525 A1 Dec. 30, 2021

(30) Foreign Application Priority Data

Jun. 30, 2020 (KR) .................. 10-2020-0080378
Jun. 14, 2021 (KR) .................. 10-2021-0076827

(51) Int. Cl.
*B23K 35/00* (2006.01)
*B23K 35/36* (2006.01)
*B23K 35/40* (2006.01)
*B23K 35/02* (2006.01)

(52) U.S. Cl.
CPC ...... *B23K 35/3613* (2013.01); *B23K 35/0227* (2013.01); *B23K 35/406* (2013.01)

(58) Field of Classification Search
CPC ............ B23K 35/3613; B23K 35/0227; B23K 35/406; B23K 35/00–0294
USPC ...................................................... 228/56.3
See application file for complete search history.

(56) References Cited

U.S. PATENT DOCUMENTS

| 4,453,662 A | * | 6/1984 | Russell, II | H01H 85/06 337/296 |
| 5,088,189 A | * | 2/1992 | Brown | B23K 35/3613 427/386 |
| 5,904,782 A | | 5/1999 | Diep-Quang | |

(Continued)

FOREIGN PATENT DOCUMENTS

| JP | H10128579 A | 5/1998 |
| JP | 2002514973 A | 5/2002 |

(Continued)

OTHER PUBLICATIONS

Machine translation of JP-2011014571-A (no date available).*
(Continued)

*Primary Examiner* — Kiley S Stoner
(74) *Attorney, Agent, or Firm* — Rabin & Berdo, P.C.

(57) ABSTRACT

Provided is a wire for electric bonding, which includes a solder wire and a composition for bonding adjacent to the solder wire, the solder wire is wet when reaches to a melting point as heat is transferred, the composition for bonding includes an epoxy resin, a reducing agent, and a curing agent, the reducing agent removes a metal oxide formed on a surface of the solder wire, and the epoxy resin is cured by chemically reacting with the reducing agent and the curing agent at a curing temperature.

13 Claims, 15 Drawing Sheets

(56) References Cited

U.S. PATENT DOCUMENTS

| | | | | |
|---|---|---|---|---|
| 5,985,456 A | * | 11/1999 | Zhou | B23K 35/3618 252/512 |
| 9,462,736 B2 | | 10/2016 | Eom et al. | |
| 9,764,429 B2 | | 9/2017 | Chen et al. | |
| 10,029,334 B2 | | 7/2018 | Kim et al. | |
| 2002/0195170 A1 | * | 12/2002 | Nomura | B23K 35/0222 148/23 |
| 2003/0051770 A1 | * | 3/2003 | Nishina | B23K 35/3613 148/23 |
| 2003/0111519 A1 | * | 6/2003 | Kinney | B23K 35/3613 257/E21.503 |
| 2005/0218195 A1 | * | 10/2005 | Wilson | B23K 35/3613 257/E23.021 |
| 2012/0309866 A1 | * | 12/2012 | Jang | C22C 13/00 524/270 |
| 2015/0020923 A1 | * | 1/2015 | Gan | C08L 63/00 148/23 |
| 2015/0044465 A1 | * | 2/2015 | Ganbe | B23K 35/3616 428/378 |
| 2015/0044506 A1 | | 2/2015 | Kwak et al. | |
| 2015/0048495 A1 | * | 2/2015 | Honda | H01L 24/27 257/734 |
| 2015/0102090 A1 | * | 4/2015 | Arai | H05K 13/0465 148/23 |
| 2015/0158128 A1 | * | 6/2015 | Hagiwara | B23K 35/362 148/23 |
| 2015/0332983 A1 | * | 11/2015 | Honda | H01L 24/83 257/773 |
| 2016/0184938 A1 | * | 6/2016 | Jin | B23K 35/0266 428/389 |
| 2018/0056422 A1 | * | 3/2018 | Kim | B23K 1/203 |
| 2018/0063967 A1 | * | 3/2018 | Morales | H05K 3/341 |
| 2020/0376609 A1 | * | 12/2020 | Onitsuka | B23K 35/0244 |
| 2021/0197323 A1 | * | 7/2021 | Kurasawa | B23K 35/3613 |
| 2021/0205933 A1 | * | 7/2021 | Kirkham | B23K 35/0227 |

FOREIGN PATENT DOCUMENTS

| | | | |
|---|---|---|---|
| JP | 2011014571 A | * | 1/2011 |
| KR | 10-0987346 B1 | | 10/2010 |
| KR | 10-2014-0057545 A | | 5/2014 |
| KR | 10-1435194 B1 | | 9/2014 |
| KR | 10-2016-0078575 A | | 7/2016 |
| KR | 20200001219 A | | 1/2020 |

OTHER PUBLICATIONS

Hee-Dae Im et al., "The Latest Technology Development Trends of Flux Cored Wire", Journal of Welding and Joining, vol. 34 No. 6 (2016), pp. 1-10.

* cited by examiner

US 11,618,109 B2

1

WIRE FOR ELECTRIC BONDING

CROSS-REFERENCE TO RELATED APPLICATIONS

This U.S. non-provisional patent application claims priority under 35 U.S.C. § 119 of Korean Patent Application Nos. 10-2020-0080378, filed on Jun. 30, 2020, and 10-2021-0076827, filed on Jun. 14, 2021, the entire contents of which are hereby incorporated by reference.

BACKGROUND

The present disclosure herein relates to a composition and a shape of a wire for electric bonding, and more particularly, to a composition of a wire for electric bonding, which capable of reducing fume generation because flux is not used.

In general, a flux cored solder wire (FCW) is a wire for electric bonding prepared by filling flux including rosin-based flux, water-soluble flux, organic flux, an activator, a solvent and other additives into a solder steel.

A usage amount of the flux cored solder wire has remarkably increased over the world for the past 25 years, and a market size of the flux cored solder wire is expected to continuously grow upto 0.5 hundred million USD$ in 2027. The flux cored solder wire is generally used in a soldering field, but the applied field of the flux cored solder wire is expanded to various industrial fields because of high productivity and economical effects of the flux cored solder wire.

The flux cored solder wire performs an electrical connection such that as heat is applied, a metal oxide of a surface of a solder is removed by a flux composition, a solder tube is melt, and ultimately, the wire is wet on a surface of target metal.

However, the flux cored solder wire generates a fume caused by the flux during a bonding process using heat transfer at a high temperature. The fume is defined as a solid particles formed by a chemical reaction such as oxidation or formed such that metal vapor and/or flux vapor is condensed during soldering. All soldering fumes give harmful effects to a human body such that the soldering fume may cause pneumoconiosis or chronic obstructive pulmonary disease because of a respiratory dust size and the soldering fume itself is classified as class one carcinogens.

Also, a limitation of corrosion of a bonding portion caused by flux residues after a process exists. Also, the flux cored solder wire product is vulnerable to moisture absorption during storage because of a property of a flux material filled therein.

Thus, a wire for electric bonding capable of performing the same function as the typical flux cored solder wire and restricting fume generation is required to be developed.

SUMMARY

The present disclosure provides various types of wires for electric bonding, which are based on an epoxy resin instead of flux, initiated by heat and light to remove a metal oxide on a surface of a solder, and cured simultaneously while forming a solder bonding portion, thereby improving a bonding strength and protecting a bonding portion, in order to resolve a limitation of fume generation of the typical flux cored solder wire and simultaneously apply additional functionality.

2

The object of the present invention is not limited to the aforesaid, but other objects not described herein will be clearly understood by those skilled in the art from descriptions below.

An embodiment of the inventive concept provides a wire for electric bonding, which includes a solder wire and a composition for bonding adjacent to the solder wire, the solder wire is wet when reaches to a melting point as heat is transferred, the composition for bonding includes an epoxy resin, a reducing agent, and a curing agent, the reducing agent removes a metal oxide formed on a surface of the solder wire, and the epoxy resin is cured by chemically reacting with the reducing agent and the curing agent at a curing temperature.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Figure 1A:
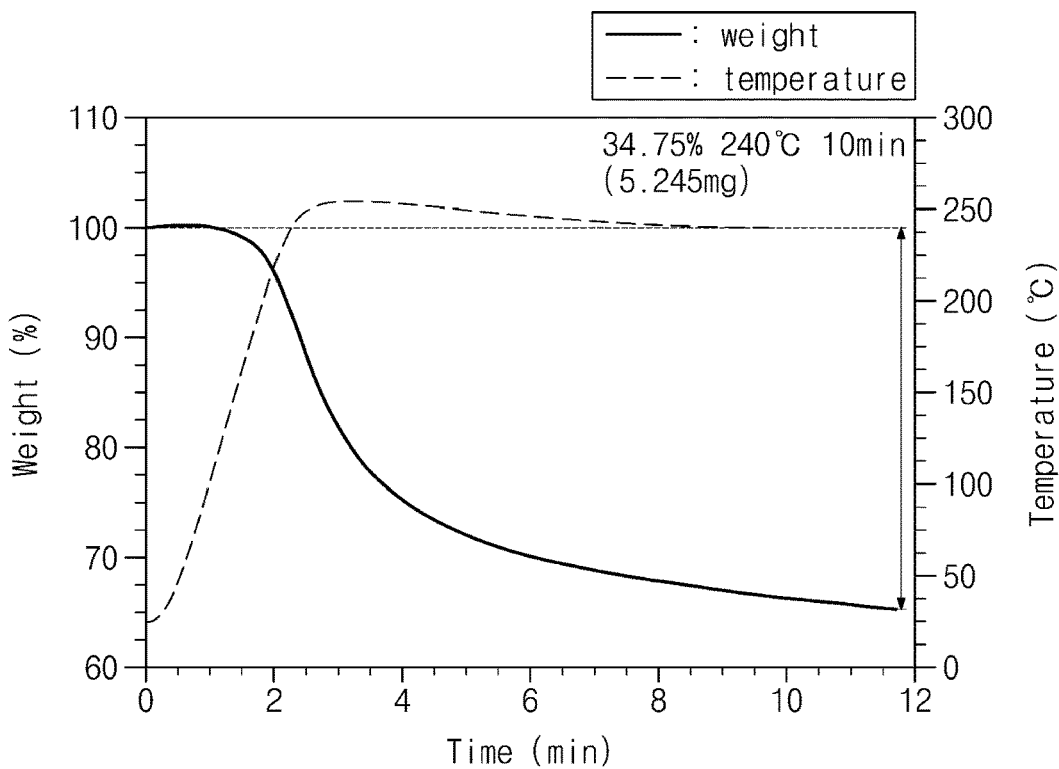
FIGS. 1A and 1B are graphs representing a weight variation according to a temperature variation of a commercial flux included in a typical flux cored solder wire and a composition for bonding included in a wire for electric bonding according to an embodiment of the inventive concept.

Exemplary embodiments of the present invention will be described with reference to the accompanying drawings so as to sufficiently understand constitutions and effects of the present invention.

The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. In addition, the sizes of the elements and the relative sizes between elements may be exaggerated for further understanding of the present invention.

In the following description, the technical terms are used only for explaining a specific exemplary embodiment while not limiting the present disclosure. Unless terms used in embodiments of the present invention are differently defined, the terms may be construed as meanings that are commonly known to a person skilled in the art.

The terms of a singular form may include plural forms unless referred to the contrary. The meaning of 'comprises' and/or 'comprising' specifies a component, a step, an operation and/or an element does not exclude other components, steps, operations and/or elements.

It will be understood that although the terms first and second are used herein to describe various elements, these elements should not be limited by these terms. These terms are used only to discriminate one region or layer from another region or layer. An embodiment described and exemplified herein includes a complementary embodiment thereof. Like reference numerals refer to like elements throughout.

Figure 1B:
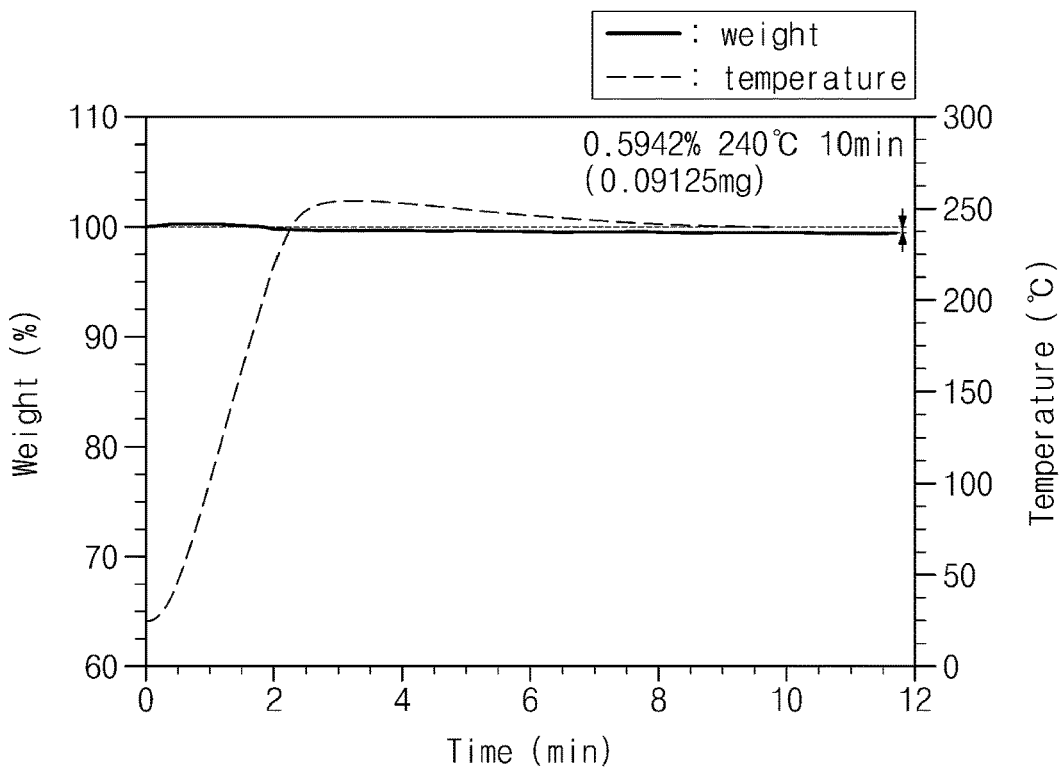

FIG. 1A is a graph representing a weight variation according to a temperature variation of a commercial flux included in a typical flux cored solder wire. FIG. 1B is a graph representing a weight variation according to a temperature variation of a composition for bonding (hereinafter, referred to as a bonding composition) included in a wire for electric bonding according to an embodiment of the inventive concept. In FIGS. 1A and 1B, a solid line represents a weight percent (wt %), and a dotted line represents a temperature. An experiment is performed such that a sample is heated with a heating rate of about 120° C. per minute from a room temperature to about 240° C. and then maintained at the temperature of about 240° C. for about 10 minutes by using TGA Q50 equipment of TA instruments company. The weight variation is expressed in percentage by a final weight according to an initial weight instead of an absolute weight. The graph may be analyzed such that when the weight percentage decreases, a fume corresponding thereto is generated.

Referring to FIG. 1A, in case of the commercial flux included in the typical flux cored solder wire, a final weight decreases by about 34.8% from an initial weight. That is, the fume is generated as much as a flux amount (5.245 mg) corresponding to about 34.8%. Referring to FIG. 1B, however, in case of the bonding composition included in the wire for electric bonding according to an embodiment of the inventive concept, a final weight decreases by 0.6% from an initial weight. That is, fume generation remarkably decreases.

Figure 2:
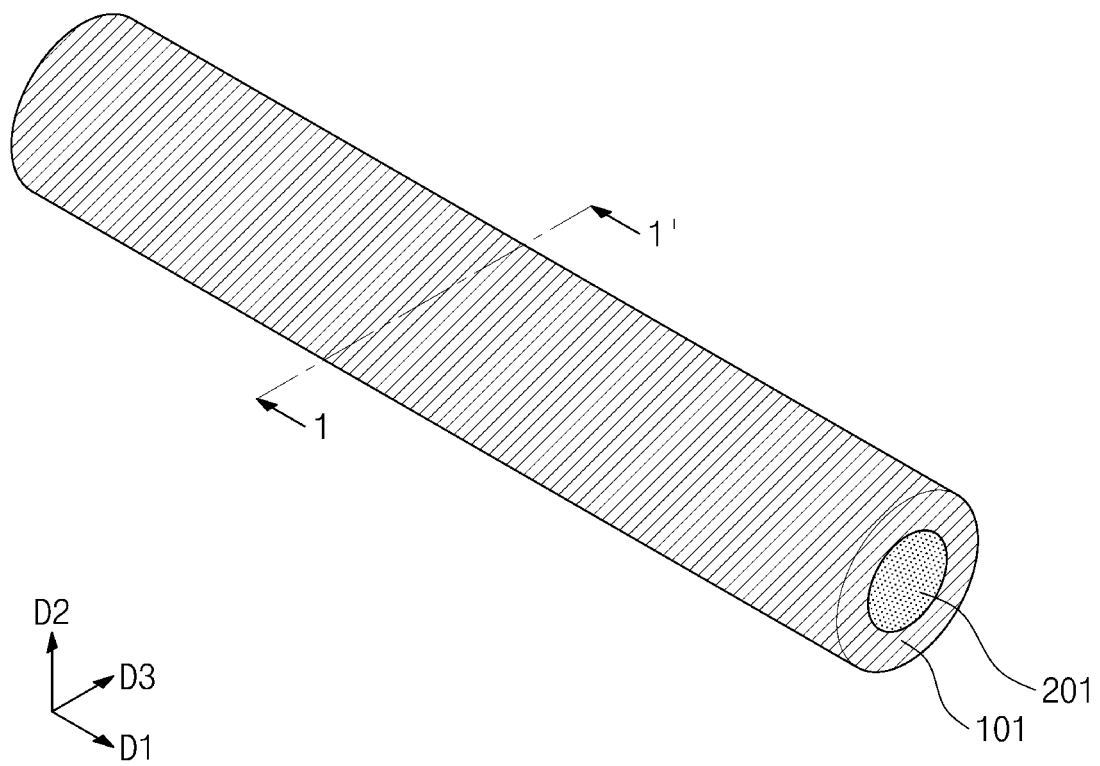
FIG. 2 is a plan view for explaining the wire for electric bonding according to embodiments of the inventive concept.
Figure 3A:
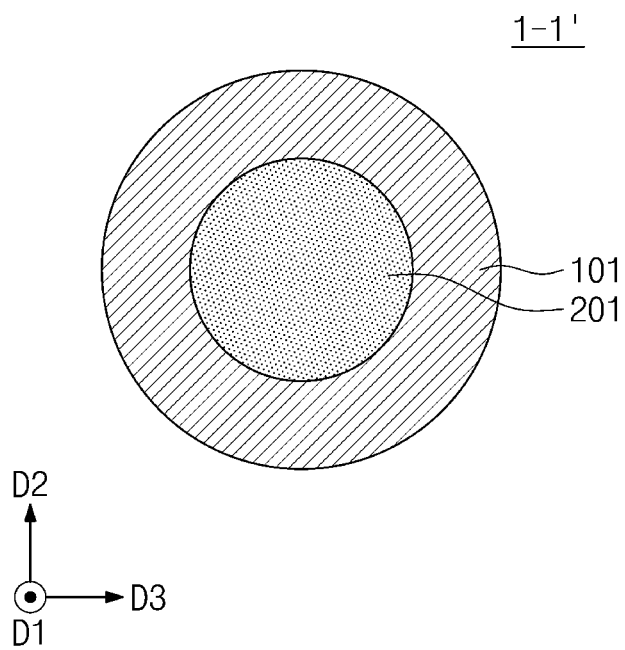
FIG. 3A is a cross-sectional view taken along line 1-1' of FIG. 2.

FIG. 2 is a view illustrating a portion of a cylindrical solder wire provided in a paste-type bonding composition according to an embodiment of the inventive concept. FIG. 3A is a cross-sectional view taken along line 1-1' of FIG. 2. Referring to FIGS. 2 and 3A, the wire for electric bonding according to an embodiment of the inventive concept may include a solder wire 101 and a bonding composition 201. The solder wire 101 may have a cylindrical shape or a polygonal cylinder shape. The bonding composition 201 may be a paste-type composition. The bonding composition 201 may be provided in the solder wire 101. Each of the solder wire 101 and the bonding composition 201 may extend in a D1 direction without limitation.

The solder wire 101 may be easily bent or curved. Although not shown in the drawings, since the wire for electric bonding is freely bent or curved, the wire may be stored and used with various shapes.

Although the wire for electric bonding may be manufactured by a process of injecting the paste-type bonding composition 201 from an end of the solder wire 101 in a vibration method, the embodiment of the inventive concept is not limited thereto.

Figure 3B:
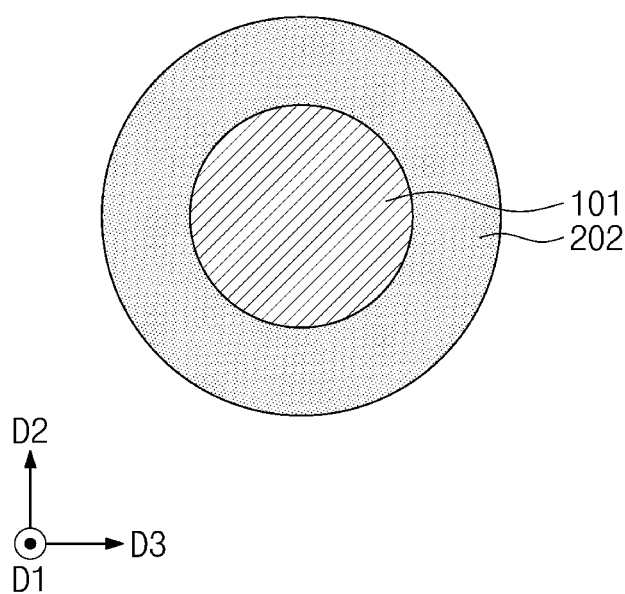
FIGS. 3B and 3C are cross-sectional views illustrating one embodiment in which a solder wire is provided inside.
Figure 3C:
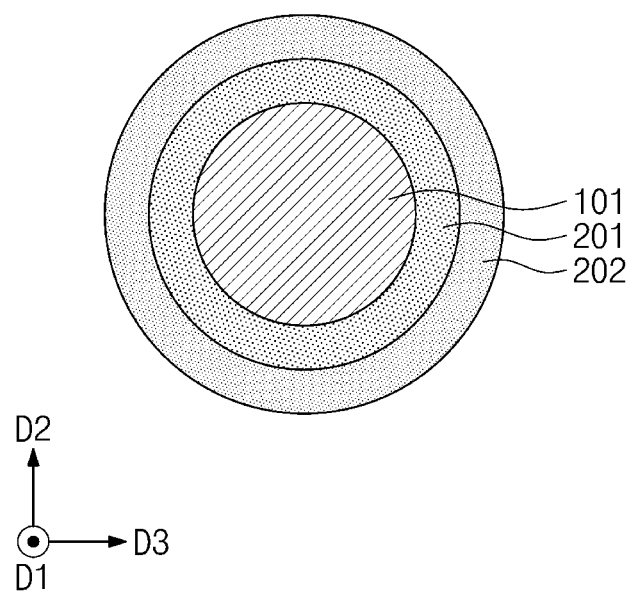

FIGS. 3B and 3C are cross-sectional views illustrating one embodiment in which the solder wire 101 is provided inside. Referring to FIGS. 3B and 3C, in the wire for electric bonding according to an embodiment of the inventive concept, the solder wire 101 may be provided inside, and the bonding composition having a cylindrical shape or a polygonal cylinder shape may be provided outside the solder wire 101. The bonding composition may be a semi-cured body 202. Thus, the wire for electric bonding may be freely bent or curved. At the same time, the semi-cured body 202 may maintain a shape surrounding the solder wire 101. Furthermore, the paste-type bonding composition 201 may be contained in the semi-cured body 202.

Figure 4A:
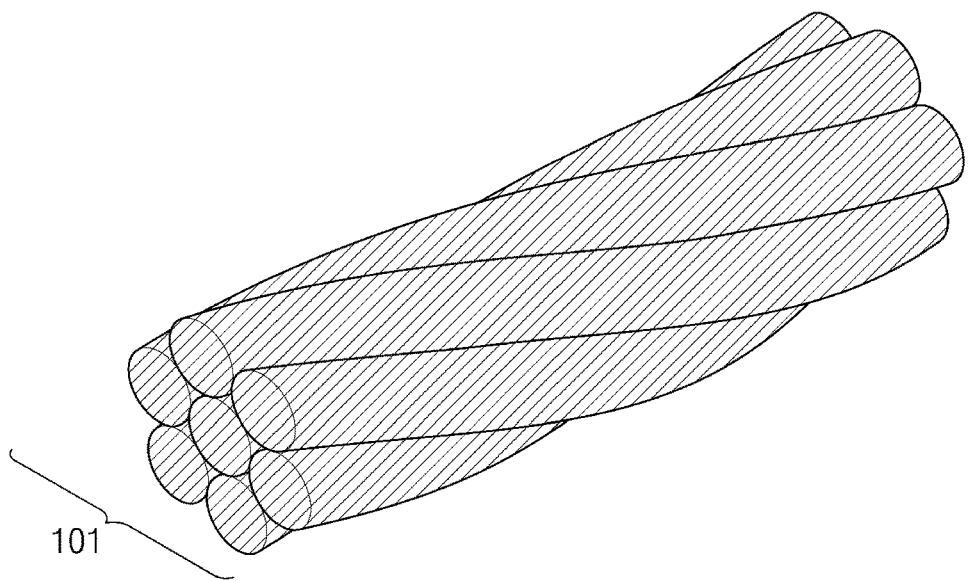
FIGS. 4A and 4B are views illustrating a plurality of solder wires in an embodiment in which the solder wire is provided in plurality.
Figure 4B:
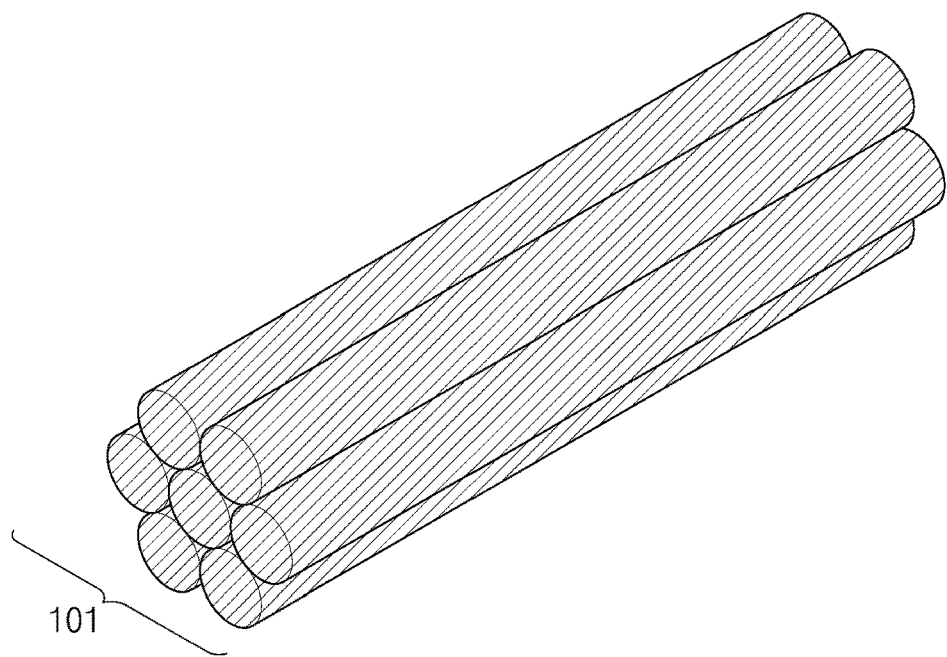

FIGS. 4A and 4B are views illustrating a plurality of solder wires 101 in an embodiment in which the solder wire 101 is provided in plurality. Referring to FIGS. 3A to 3C, 4A, and 4B, the solder wire 101 provided in the semi-cured body 202 may be a plurality of solder wires 101. In an embodiment, the plurality of solder wires 101 may extend while being adjacent to each other and twisted in a spiral shape as in FIG. 4A. In an embodiment, the plurality of solder wires 101 may linearly extend while being adjacent to each other as in FIG. 4B. Also, the shape of the plurality of solder wires 101 may not be limited to the linear or spiral shape.

Figure 5A:
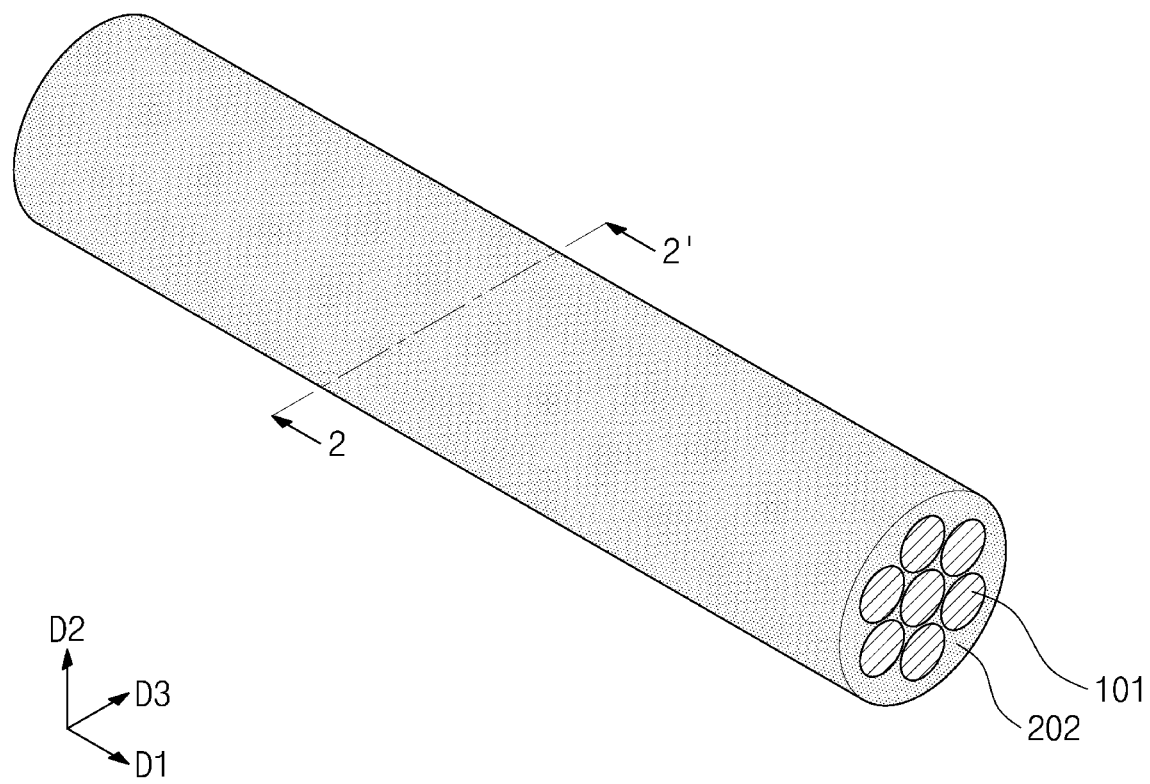
FIG. 5A is a view illustrating a portion of a wire for electric bonding, in which a plurality of solder wires are provided in a semi-cured body.
Figure 5B:
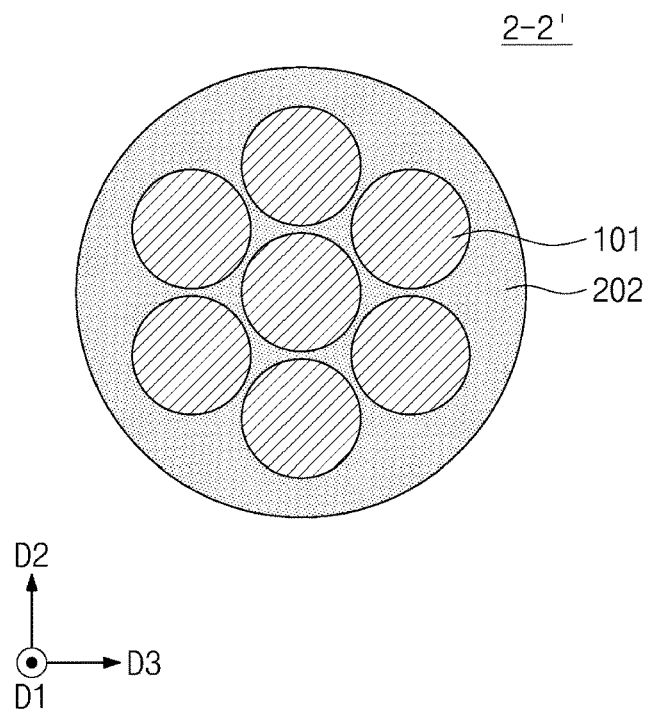
FIG. 5B is a cross-sectional view obtained by cutting the wire for electric bonding along line 2-2' in FIG. 5A.
Figure 5C:
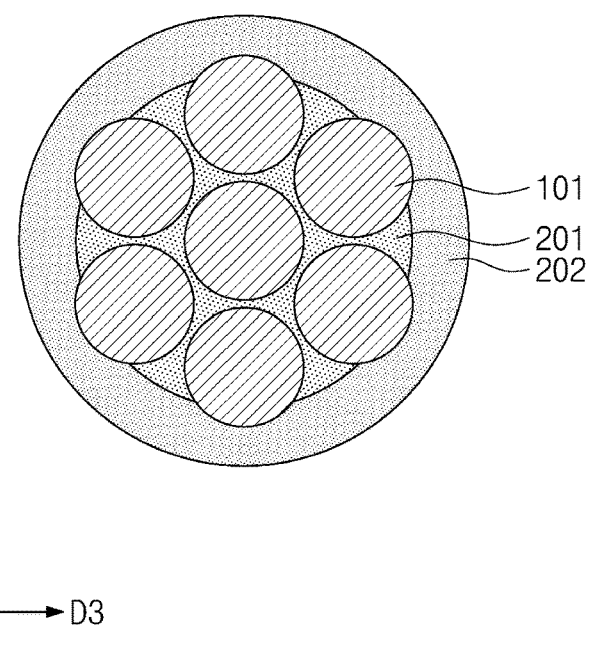
FIG. 5C is a cross-sectional view illustrating a wire in which a paste-type composition for bonding is further included in the semi-cured body.

FIG. 5A is a view illustrating a portion of a wire for electric bonding, in which a plurality of solder wires 101 are provided in a semi-cured body 202. FIG. 5B is a cross-sectional view obtained by cutting the wire for electric bonding along line 2-2' of FIG. 5A. FIG. 5C is a cross-sectional view illustrating a wire in which a paste-type bonding composition 201 is contained in the semi-cured body 202. Referring to FIGS. 5A to 5C, according to an embodiment of the inventive concept, the plurality of solder wires 101 may be provided inside, and a semi-cured bonding composition, i.e., the semi-cured body 202, may surround the plurality of solder wires 101. Each of the semi-cured body 202 and the plurality of solder wires 101 may extend in the D1 direction. Furthermore, the paste-type bonding composition 201 may be further contained in the semi-cured body 202.

The wire for electric bonding, in which the solder wire 101 is provided in the semi-cured body 202, may be freely bent or curved. Likewise, the wire for electric bonding, in which the paste-type bonding composition 201 is further contained in the semi-cured body 202, may be also freely bent or curved. Thus, the wire for electric bonding may be stored and used with various shapes.

Figure 6:
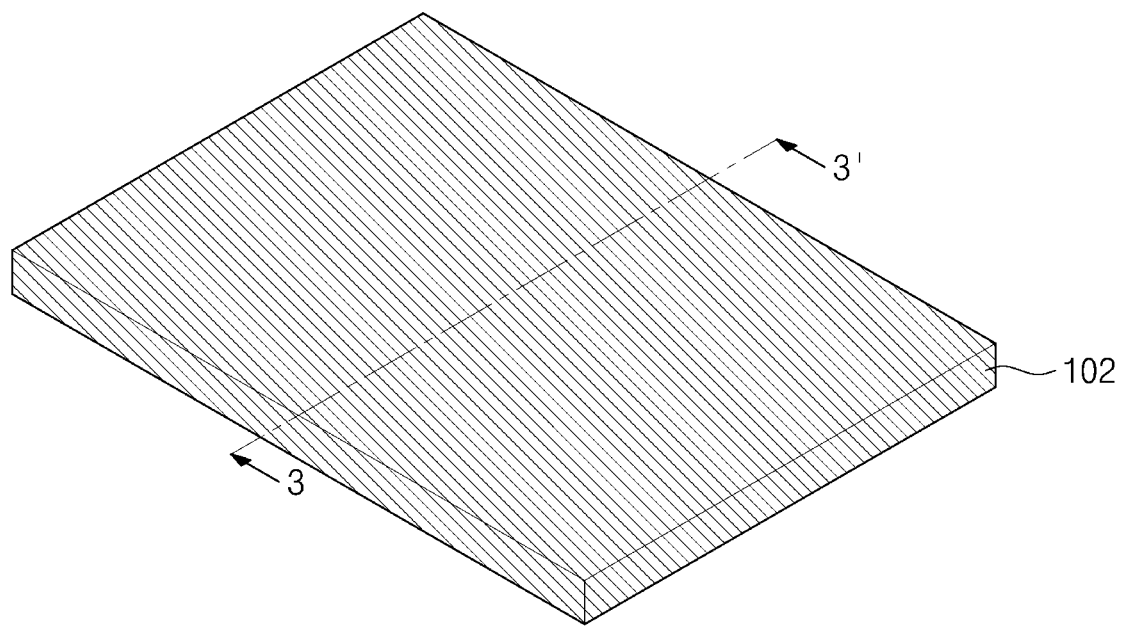
FIG. 6 is a view illustrating a solder strip in one embodiment of a manufacturing process of a wire for electric bonding.

FIG. 6 is a view illustrating a solder strip 102 in a manufacturing process of the wire for electric bonding. The solder strip 102 may be included in the manufacturing process of the wire for electric bonding according to an embodiment of the inventive concept. The solder strip 102 may have a flat shape at the beginning of the manufacturing process. Also, the solder strip 102 may be freely bent or curved.

Figure 7A:
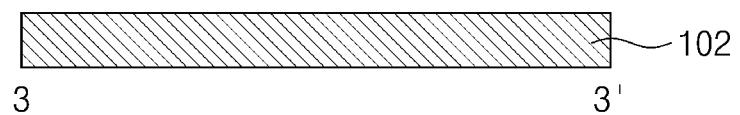
FIG. 7A is a cross-sectional view obtained by cutting a solder strip along line 3-3' of FIG. 6.
Figure 7B:
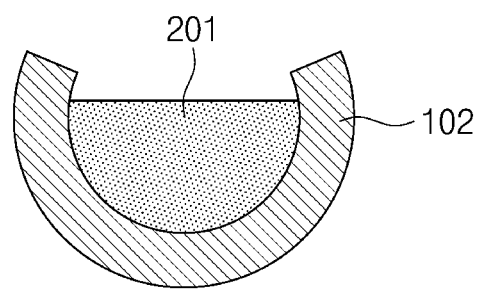
FIGS. 7B to 7D are cross-sectional views representing each process in one embodiment of a method for manufacturing the wire for electric bonding according to an embodiment of the inventive concept.
Figure 7C:
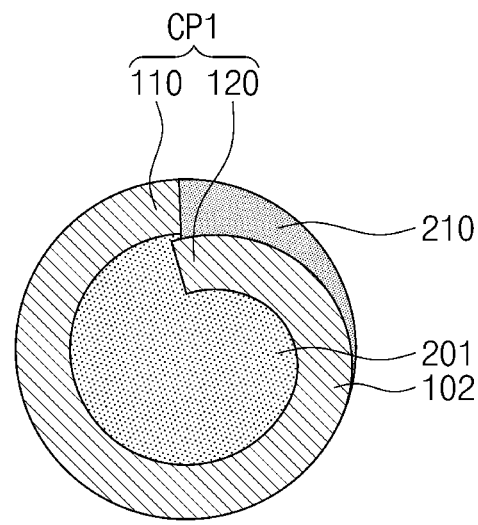
Figure 7D:
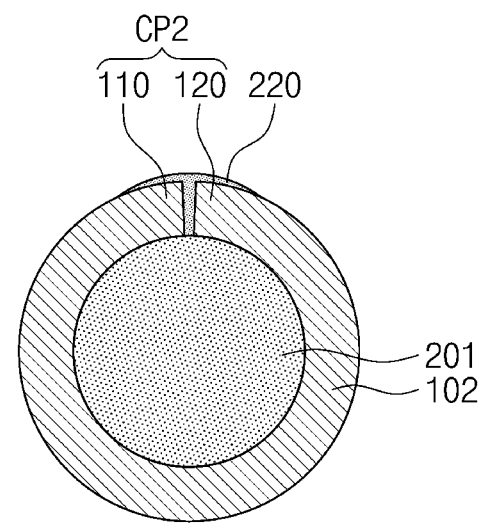

FIG. 7A is a cross-sectional view obtained by cutting the solder strip along line 3-3' of FIG. 6. FIGS. 7B to 7D are cross-sectional views representing each process in one embodiment of a method for manufacturing the wire for electric bonding according to an embodiment of the inventive concept.

Referring to FIGS. 7A to 7D, both ends of the solder strip 102 may be formed into a U-shape. A paste-type bonding composition 201 may be filled in the solder strip 102 that is formed into the U-shape. Thereafter, the both ends of the U-shaped solder strip 102 are rolled so that the both ends are adjacent to each other. On a cross-section of the solder strip 102, one end is defined as a first end 110, and the other end is defined as a second end 120.

Referring to FIG. 7C, as an embodiment, the second end 120 may be disposed below the first end 110 although the second end 120 is adjacent to the first end 110. That is, a shape of the first end 110 and the second end 120, i.e., a seam portion, may be overlap, and accordingly, a first bonding portion CP1 may be formed. The paste-type bonding composition may be provided to the first bonding portion CP1 and then semi-cured by applying heat or light thereto. For example, the bonding composition may be provided on the solder strip 102 adjacent to the second end 120. The bonding composition may be provided to cover the first end 110. The bonding composition may be semi-cured and formed into a semi-cured body 210. Thus, the wire including the solder strip 102 in which the paste-type bonding composition 201 is filled and the semi-cured body 210 may have an O-shaped cross-section. The paste-type bonding composition 201 filled in the solder strip 102 may not be leaked to the outside by the semi-cured body 210.

The semi-cured body may be obtained by semi-curing the paste-type bonding composition 201 leaked from the solder strip in a process of manufacturing the semi-cured body.

Referring to FIG. 7D, as another embodiment, the second end 120 may be disposed at a side of the first end 110 although the second end 120 is adjacent to the first end 110. That is, a bonding shape of the first end 110 and the second end 120, i.e., a seam portion, may be butt, and accordingly, a second bonding portion CP2 may be formed. The paste-type bonding composition may be provided to the second bonding portion CP2 and then semi-cured by applying heat or light thereto. For example, a gap is defined between the first end 110 and the second end 120, the paste-type bonding composition may be provided between the first end 110 and the second end 120 or above the gap, and the provided paste-type bonding composition may be semi-cured to provide a semi-cured body 220. Thus, the wire including the solder strip 102 in which the paste-type bonding composition 201 is filled and the semi-cured body 220 may have an O-shaped cross-section. The paste-type bonding composition 201 filled in the solder strip 102 may not be leaked to the outside by the semi-cured body 220.

The semi-cured body may be obtained by semi-curing the paste-type bonding composition 201 leaked from the solder strip in a process of manufacturing the semi-cured body.

The wire for electric bonding manufactured from the above embodiments may be freely bent or curved. Thus, the wire for electric bonding may be stored and used with various shapes.

Figure 8:
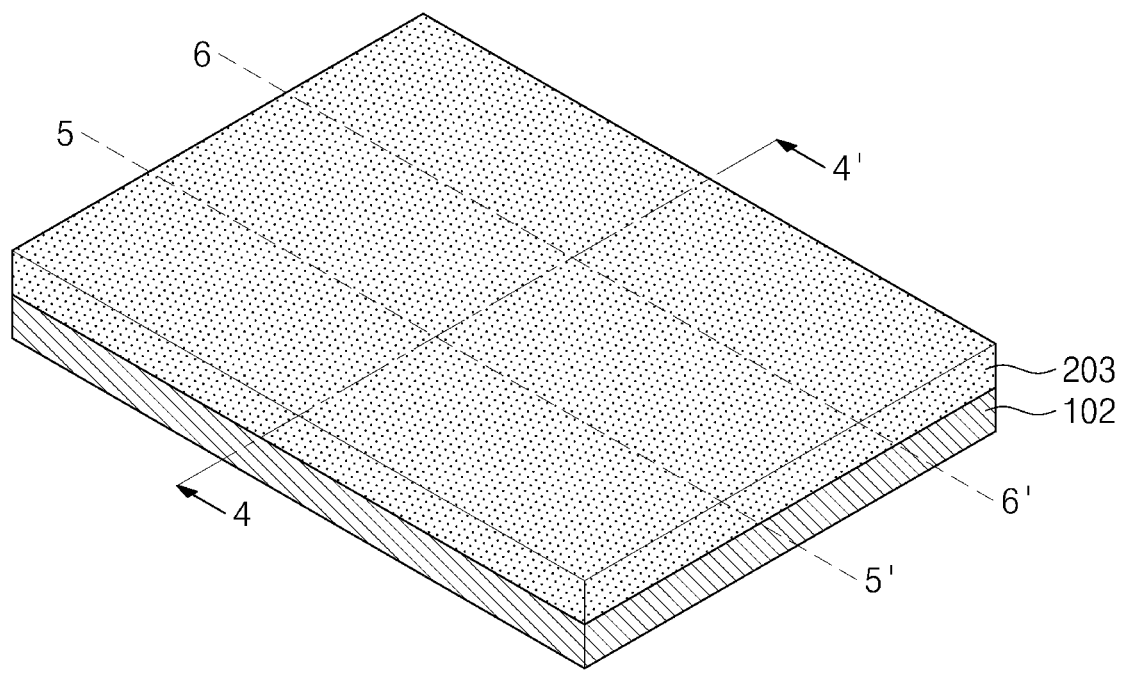
FIG. 8 is a view illustrating a state in which a semi-cured body is applied on a solder strip in one embodiment of the wire for electric bonding according to an embodiment of the inventive concept.
Figure 9:
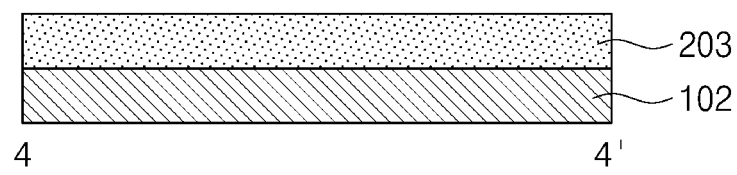
FIG. 9 is a cross-sectional view taken along line 4-4' of FIG. 8.

FIG. 8 is a representative view illustrating a state in which the semi-cured body 203 is applied on the solder strip 102 in one embodiment of the method for manufacturing the wire for electric bonding according to an embodiment of the inventive concept. FIG. 9 is a cross-sectional view taken along line 4-4' of FIG. 8. Referring to FIGS. 8 and 9, in one embodiment of the method for manufacturing the wire for electric bonding according to an embodiment of the inventive concept, the semi-cured body 203 may be applied on one surface or both surfaces of the solder strip 102. The semi-cured body 203 may be obtained by providing the bonding composition on the solder strip 102 and then semi-curing the provided bonding composition. Each of the solder strip 102 and the semi-cured body 203 may be freely bent or curved.

Figure 10A:
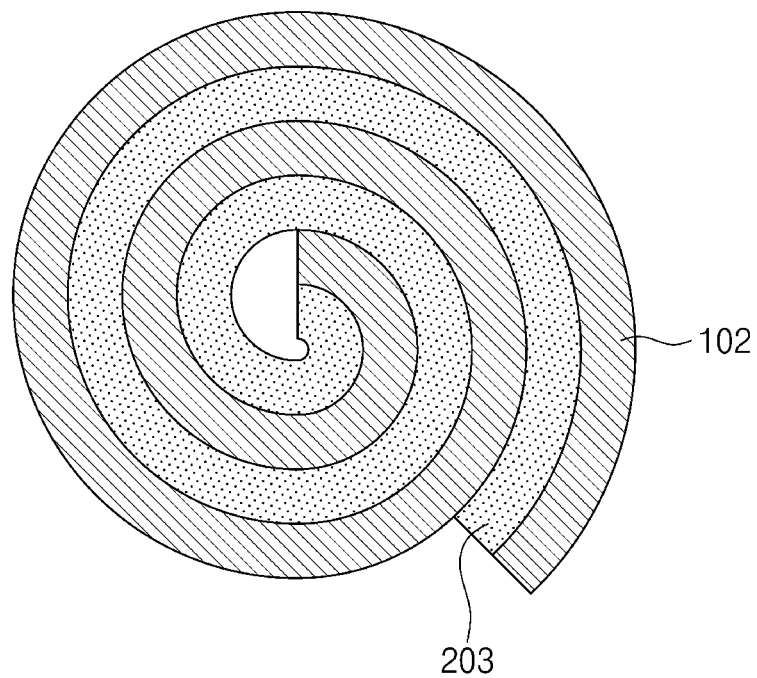
FIG. 10A is a cross-sectional view illustrating a wire manufactured by rolling a solder strip coated with a semi-cured body in one embodiment of the method for manufacturing the wire for electric bonding according to an embodiment of the inventive concept.

FIG. 10A is a cross-sectional view illustrating a wire manufactured by rolling the solder strip 102 coated with the semi-cured body 203 in one embodiment of the method for manufacturing the wire for electric bonding according to an embodiment of the inventive concept. Referring to FIG. 10A, for example, the semi-cured body 203 may be applied to one surface of the solder strip 102. Thereafter, the wire may be manufactured so that the solder strip 102 is disposed outside. That is, the wire for electric bonding may be formed by rolling the solder strip 102 coated with the semi-cured body 203 so that the solder strip 102 is disposed outside. For another example, the semi-cured body 203 may be applied to each of both surfaces of the solder strip 102. Likewise, the wire for electric bonding may be manufactured by rolling the solder strip 102 coated with the semi-cured body 203.

Figure 10B:
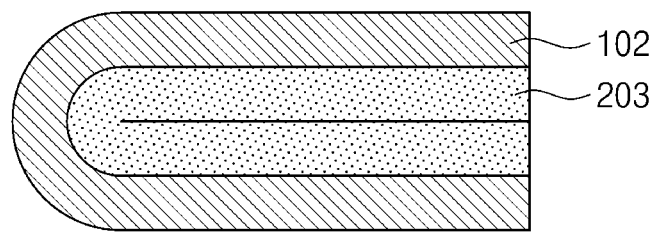
FIG. 10B is a cross-sectional view illustrating a wire manufactured by folding the solder strip coated with the semi-cured body in one embodiment of the method for manufacturing the wire for electric bonding according to an embodiment of the inventive concept.

FIG. 10B is a cross-sectional view illustrating a wire manufactured by folding the solder strip 102 coated with the semi-cured body 203 in one embodiment of the method for manufacturing the wire for electric bonding according to an embodiment of the inventive concept. Referring to FIG. 10B, the solder strip 102 coated with the semi-cured body 203 may be folded so that the semi-cured body 203 is disposed inside. That is, the solder strip 101 may be disposed outside, and the semi-cured body 203 may be folded so that an empty space is not defined at the inside.

Figure 10C:
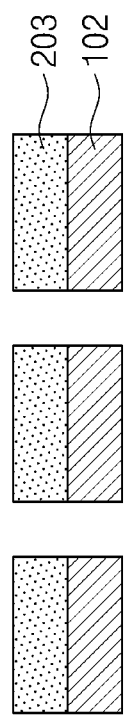
FIG. 10C is a cross-sectional view illustrating a wire manufactured by cutting the solder strip coated with the semi-cured body along lines 5-5' and 6-6' in one embodiment of the method for manufacturing the wire for electric bonding according to an embodiment of the inventive concept.

FIG. 10C is a cross-sectional view illustrating the wire after the solder strip 102 coated with the semi-cured body 203 is cut along line 5-5' and line 6-6' of FIG. 8. Referring to FIGS. 8 and 10C, the wire for electric bonding may be manufactured by cutting the solder strip coated with the semi-cured body 203 in one embodiment of the method for manufacturing the wire for electric bonding according to an embodiment of the inventive concept. That is, the solder strip coated with the semi-cured body 203 may be cut along the line 5-5' and the line 6-6', and a portion of the cut solder strip 102 and semi-cured body 203 may be used as a wire.

Figure 11A:
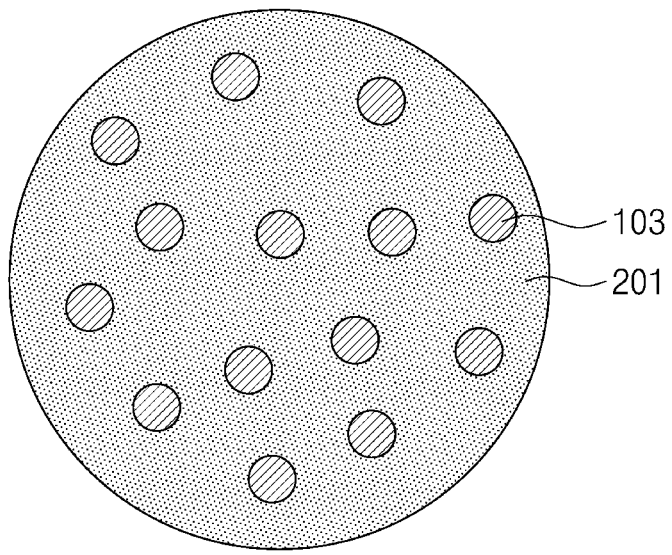
FIGS. 11A to 11C are cross-sectional views of the wire illustrating each process of a method for manufacturing the wire for electric bonding in which the solder wire is not provided.
Figure 11B:
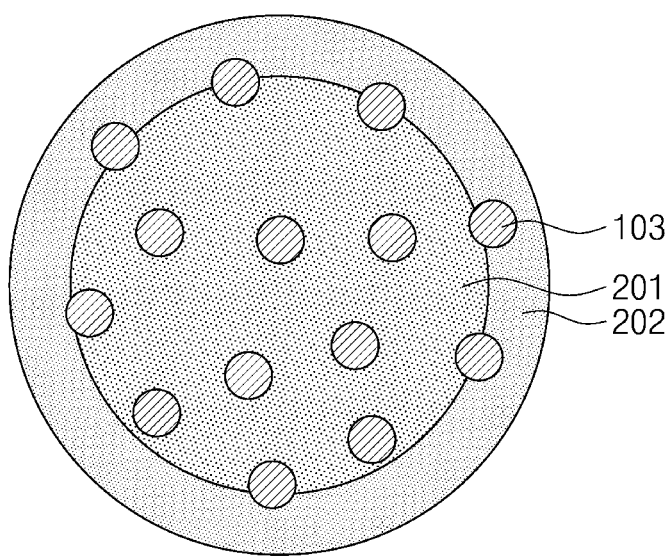
Figure 11C:
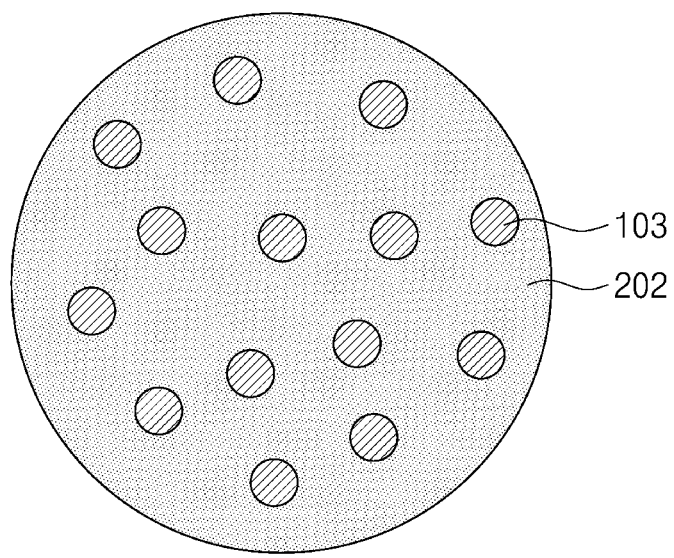

FIGS. 11A to 11C are cross-sectional views of a wire illustrating each process of a method for manufacturing a wire for electric bonding in which the solder wire is not provided. Referring to FIGS. 11A to 11C, a process of maintaining the paste-type bonding composition 201 in a cylindrical shape or a polygonal cylinder shape may be included. Here, solder powder 103 may be further included in the paste-type bonding composition 201. Thereafter, the paste-type bonding composition 201 exposed to the outside may be semi-cured as in FIG. 11B. That is, an outer portion of the cylindrical shape or the polygonal cylinder shape may be a semi-cured body 202. Also, as in FIG. 11C, the entire paste-type bonding composition 201 provided to the wire may be semi-cured. For example, the paste-type bonding composition 201 may not exist in the semi-cured body 202 except for the solder powder 103.

Conductors bonded after a bonding process may be electrically connected by the solder powder in the wire for electric bonding manufactured from the above embodiments. Although not shown in the drawings, the solder powder may not be included therein. In this case, although a solder element may be additionally provided in a metal part or a target metal pad for electric bonding, the embodiment of the inventive concept is not limited thereto.

One embodiment of the inventive concept includes a wire in which the flux in the typical flux cored solder wire is replaced by a bonding composition including an epoxy resin. The flux cored solder wire generates a fume caused by flux during a bonding process using heat transfer. The fume is defined as a solid particles formed by a chemical reaction such as oxidation or formed such that metal vapor is condensed during soldering. The fume may be respiratory dusts. Thus, the fume gives harmful effects to a human body such that when a person inhales the fume through breathing, the fume may cause pneumoconiosis or chronic obstructive pulmonary disease, and the fume itself is classified as class one carcinogens.

One embodiment of the inventive concept may include the solder wire and the bonding composition. The bonding composition may include at least one of an epoxy resin, a curing agent, a reducing agent, a thermoplastic resin, a cationic initiator, a (meth)acrylic resin, a radical initiator, a catalyst, and solder particles.

The epoxy resin may be selected from a bisphenol A-type epoxy resin, a bisphenol F-type epoxy resin, a bisphenol S-type epoxy resin, a brominated bisphenol A-type epoxy resin, a hydrogenated bisphenol A-type epoxy resin, a bisphenol AF-type epoxy resin, a biphenyl type epoxy resin, a naphthalene type epoxy resin, a fluorene type epoxy resin, a trishydroxyphenylmethane type epoxy resin, a tetraphenylolethane type epoxy resin, an alicyclic epoxy resin, a cresol novolac epoxy resin, a phenol novolac epoxy resin, a bisphenol novolac epoxy resin, a hydantoin type epoxy resin, a trisglycidyl isocyanurate type epoxy resin, a glycidylamine type epoxy resin, a polyfunctional epoxy resin, a urethane-modified epoxy resin, a phenoxy resin, and an epoxy siloxane resin, or a combination thereof. However, the embodiment of the inventive concept is not limited thereto.

The curing agent may include all sorts of curing agents as long as the curing agent may chemically react with the epoxy resin and be cured under a curing temperature condition. For example, the curing agent may be selected from at least one of: an amine-based curing agent such as diethylenetriamine, triethylenediamine, triethylenetetramine, tetraethylenepentaamine, diethylaminopropyleneamine, aminoethylpiperazine, menthanediamine, isoprondiamine, metaphenylenediamine, diaminodiphenylmethane, diaminodiphenylsulfone, 2-methyl-4-nitroaniline, and dicyandiamide; an imidazole-based curing agent such as 2-methylimidazole, 2-ethyl-4-methylimidazole, 2,4-dimethylimidazole, 2-phenylimidazole, 2-phenyl-4-methylimidazole, 1-cyanoethyl-2-undecylimidazolium trimellitate, and epoxyimidazole adduct; a phenolic curing agent such as phenol novolac resin and cresol novolac resin; an acid anhydride curing agent such as phthalic anhydride, trimellitic anhydride, pyromellitic dianhydride, benzophenonetetracarboxylic dianhydride, maleic anhydride, tetrahydrophthalic anhydride, methyl tetrahydrophthalic anhydride, endomethylenetetrahydrophthalic anhydride, methylendomethylenetetrahydrophthalic anhydride, methylbutenyltetrahydrophthalic anhydride, dodecenylsuccinic anhydride, hexahydrophthalic anhydride, methylhexahydrophthalic anhydride, succinic anhydride, methylcyclohexene dicarboxylic acid anhydride, and chlorendic anhydride, or a combination thereof. However, the embodiment of the inventive concept is not limited thereto.

The reducing agent may include all sorts of reducing agents as long as the reducing agent may remove a metal oxide formed or to be formed on a surface of the solder wire and simultaneously chemically react with the epoxy resin to be cured. For example, the reducing agent may be selected from at least one of amino acid, carboxylic acid such as formic acid, acetic acid, propionic acid, butyric acid, valeric acid, caproic acid, caprylic acid, decanoic acid, lauric acid, myristic acid, palmitic acid, stearic acid, oleic acid, linoleic acid, alpha-linolenic acid, cyclohexanecarboxylic acid, phenylacetic acid, benzoic acid, chlorobenzoic acid, bromobenzoic acid, nitrobenzoic acid, phthalic acid, isophthalic acid, terephthalic acid, salicylic acid, hydroxybenzoic acid, anthranilic acid, aminobenzoic acid, methoxybenzoic acid, glutaric acid, maleic acid, azelaic acid, abietic acid, adipic acid, ascorbic acid, acrylic acid, and citric acid, or a combination thereof. However, the embodiment of the inventive concept is not limited thereto.

An equivalence ratio of the curing agent and the reducing agent with respect to the epoxy resin may be about 0.5 to about 1.5. However, the embodiment of the inventive concept is not limited thereto. When the equivalence ratio is less than about 0.5, unreacted epoxy resin may exist in a cured material after curing is completed. When the equivalence ratio is equal to or greater than about 1.5, unreacted curing agent or reducing agent may exist in the cured material after the curing is completed. Thus, the thermomechanical characteristic and reliability of the cured material may be degraded. However, the embodiment of the inventive concept is not limited thereto.

The thermoplastic resin may be a constituent for realizing a semi-cured state of the bonding composition. For example, the thermoplastic resin may be selected from at least one of natural rubber, butyl rubber, isoprene rubber, chloroprene rubber, ethylene-vinyl acetate copolymer, ethylene-acrylic acid copolymer, ethylene-acrylic acid ester copolymer, polybutadiene resin, polycarbonate resin, thermoplastic polyimide resin, 6-nylon, 6,6-nylon, polyamide resin, phenoxy resin, acrylic resin, PET, PBT, saturated polyester resin, polyamideimide resin, and fluororesin, or a combination thereof.

The thermoplastic resin may have a weight-average molecular weight of about 10,000 g/mol or more, preferably about 20,000 g/mol to about 2,000,000 g/mol. However, the embodiment of the inventive concept is not limited thereto. The thermoplastic resin may be contained with a range from about 0 wt % to about 40 wt % in the electric bonding composition. However, the embodiment of the inventive concept is not limited thereto.

The cationic initiator may be initiated by heat treatment or light irradiation. Thus, the metal oxide formed on or to be formed on the surface of the solder wire may be removed. At the same time, the bonding composition may become the semi-cured body by curing the epoxy resin. That is, the cationic initiator may include all sorts of cationic initiators as long as the cationic initiator may generate acids according to Brønsted-Lowry theory of acids and bases or Lewis theory of acids and bases by heat treatment or light irradiation. For example, the cationic initiator may be selected from at least one of: phosphonium-based cationic initiator such as ytterbium trifluoromethenesulfonate salt, samarium trifluoromethenesulfonate salt, erbium trifluoromethenesulfonate salt, ianthanum trifluoromethenesulfonate salt, tetrabutylphosphonium methenesulfonate salt, and ethyltriphenylphosphonium bromide salt; a sulfonium-based cationic initiator such as 3-Methyl-2-butenyltetramethylenesulfonium hexafluoroantimonate salt, triarylsulfonium hexafluoroantimonate salt, triarylsulfonium hexafluorophosphate salt, 9-(4-hydroxyethoxyphenyl)cyansrhenium hexafluorophosphate salt, and 1-(3-methylbut-2-enyl)tetrahydro-1H-thiopenium hexafluoroantimonate salt; an iodonium-based cationic initiator such as diphenyldiodonium hexafluoroantimonate salt, diphenyldiodonium hexafluorophosphate salt, and ditorilliodonium hexafluorophosphate salt; and thermal acid generator, or a combination thereof. However, the embodiment of the inventive concept is not limited thereto. The cationic initiator may be added at about 0 parts by weight to about 10 parts by weight based on about 100 parts by weight of the epoxy resin. However, the embodiment of the inventive concept is not limited thereto.

The (meth)acrylic resin may be used together with the radical initiator and cured by heat treatment or light irradiation. Thus, the bonding composition may become the semi-cured body. The (meth)acrylic resin may include at least one (meth)acrylic group per one molecule. The (meth)acrylic resin may be contained with a range from about 0 wt % to about 40 wt % in the electric bonding composition. However, the embodiment of the inventive concept is not limited thereto.

The radical initiator may be initiated by heat treatment or light irradiation. Thus, the electric bonding composition may become the semi-cured body by curing the (meth)acrylic resin. The radical initiator may be selected from at least one of methyl ethyl ketone peroxide, cumine hydroperoxide, t-butyl perbenzoate, 1,1-di-t-butyl peroxy-3,3,5-trimethyl cyclohexane, dilaurolyl peroxide, dibenzoyl peroxide, benzophenone, benzyl ketone, 2-chloro-thioxanthone, 2,4-diethyl-thioxanthone, benzoin ethyl ether, diethoxy acetophenone, benzylmethyl ketal, 2-hydroxy-2-methyl-1-phenyl-1-propanone, and 1-hydroxy-cyclohexylphenylketone, or a combination thereof. However, the embodiment of the inventive concept is not limited thereto. The radical initiator may be added at about 0.1 parts by weight to about 10 parts by weight based on about 100 parts by weight of the (meth)acrylic resin. However, the embodiment of the inventive concept is not limited thereto.

The catalyst may reduce a curing time of the bonding composition. The catalyst may be selected from at least one of imidazole catalyst such as 2-methylimidazole, 2-ethyl-4-methylimidazole, 2,4-dimethylimidazole, 2-phenylimidazole, 2-phenyl-4-methylimidazole, 1-cyanoethyl-2-undecylimidazolium trimellitate, and epoxyimidazole adduct, a tertiary amine catalyst such as triethylamine, benzyldimethylamine, methylbenzyldimethylamine, 2-(dimethylaminomethyl)phenol, 2,4,6-tris(dimethylaminomethyl)phenol, 1,8-diazabicyclo[5,4,0]undecene-7, 1,5-diazabicyclo[4.3.0] non-5-ene, boron trichloride, and boron trifluoride, a phosphine catalyst such as triphenylphosphine, trimethylphosphine, triethylphosphine, tributylphosphine, tri(p-methylphenyl)phosphine, and tri(nonylphenyl)phosphine, and a urea derivative catalyst such as N-4-chlorophenyl-N' and N'-dimethylurea (monuron), or a combination thereof. The catalyst may be added at about 0 parts by weight to about 10 parts by weight based on about 100 parts by weight of the epoxy resin. However, the embodiment of the inventive concept is not limited thereto.

Each of the solder particles, the solder wire, and the solder strip may include at least one of metal such as tin (Sn), silver (Ag), copper (Cu), lead (Pb), bismuth (Bi), indium (In), cadmium (Cd), antimony (Sb), gallium (Ga), arsenic (As), germanium (Ge), zinc (Zn), aluminum (Al), gold (Au), silicon (Si), nickel (Ni), and phosphorus (P), or nonmetal, and an alloy selected from a combination thereof. However, the embodiment of the inventive concept is not limited thereto. For example, the alloy may be configured with a composition ratio such as 96.5Sn/3.5Ag, 55.5Bi/44.5Pb, 96.5Sn/3.0Ag/0.5Cu, 52Bi/32Pb/16Sn, 58Bi/42Sn, 57Bi/42Sn/1Ag, 50In/50Sn, 33In/67Bi, 17Sn/26In/57Bi, or 52In/48Sn. However, the embodiment of the inventive concept is not limited thereto. A size of each of the solder particles may be selected in a range from about 5 nm to about 5 mm, and the solder particle may be contained with a range from about 0 volume % to about 60 volume % in the electric bonding composition. However, the embodiment of the inventive concept is not limited thereto.

The bonding composition for realizing the wire for electric bonding according to an embodiment of the inventive concept may include the epoxy resin, the curing agent, and the reducing agent. Furthermore, when the semi-curing of the bonding composition is necessary to be realized, the bonding composition may additionally include at least one of the thermoplastic resin, the cationic initiator, the (meth) acrylic resin, and the radical initiator. Also, although the bonding composition may selectively include the cationic initiator, the catalyst, and the solder particles, the embodiment of the inventive concept is not limited thereto. Although a solvent may be included to improve a coating property of the bonding composition, the embodiment of the inventive concept is not limited thereto. When the bonding composition includes the solvent, a drying process for removing the solvent before a semi-curing process may be additionally included. However, the embodiment of the inventive concept is not limited thereto.

A heat treatment condition in the curing process over embodiments of the inventive concept may be in a range from about 50° C. to about 300° C. and light having a wavelength of 100 nm to 1.5 m may be used for light irradiation. However, the embodiment of the inventive concept is not limited thereto.

The term "semi-cured body" used herein includes a semi-cured epoxy resin composition. The semi-cured body may be fixed, or simultaneously bent or curved. That is, the semi-cured body may be folded in a range from about 900 to about 180°. The semi-cured body may be semi-cured by performing only a portion of the curing process on the bonding composition. For example, the semi-curing process may include a method for heating the epoxy resin composition for several milliseconds to about 30 minutes at a temperature of about 50° C. to about 300° C. However, the embodiment of the inventive concept is not limited thereto. For example, the heat treatment or the light irradiation may be locally performed.

However, when the bonding composition is completely cured, the epoxy resin composition may be cured.

The cured epoxy resin composition may be prepared by curing the uncured epoxy resin composition or the semi-cured epoxy resin composition. A method for the curing treatment may be approximately selected according to a composition of the epoxy resin composition and purposes of the epoxy resin composition, but performed through heating and pressing.

For example, the cured epoxy resin composition may be prepared by heating the uncured epoxy resin composition or the semi-cured epoxy resin composition at a temperature of about 50° C. to about 300° C. for about 1 hour to about 10 hours or at a temperature of about 130° C. to about 230° C. for about 1 hour to about 8 hours.

The bonding composition including the uncured epoxy resin composition may be a paste-type composition. That is, when the bonding composition is not the semi-cured body or not cured, the bonding composition may have a freely changeable shape.

The wire for electric bonding according to the embodiment of the inventive concept may replace the typical flux by including the composition for bonding, which includes the solder wire, the epoxy resin, the curing agent, and the reducing agent.

Thus, in the soldering process using the wire for electric bonding according to the embodiment of the inventive concept, the fume generation remarkably decreases, the cleaning process caused by the flux residues is not required, and the composition for bonding remained around the bonding portion is cured to protect the bonding portion.

As the thermoplastic resin and/or the cationic initiator and/or the (meth)acrylic resin and the radical initiator are further included in the composition for bonding, the composition for bonding may be initiated by heat or light to be partially cured, thereby realizing the semi-cured body.

Because of the semi-curing of the composition for bonding, the wire for electric bonding may be stored and used with various shapes. Also, when the composition for bonding after the bonding process is completely cured, the mechanical, thermal, and chemical reliability of the bonding improves.

Although the embodiments of the present invention have been described, it is understood that the present invention should not be limited to these embodiments but various changes and modifications can be made by one ordinary skilled in the art within the spirit and scope of the present invention as hereinafter claimed. Thus, the above-disclosed embodiments are to be considered illustrative and not restrictive.

What is claimed is:

1. A wire for electric bonding, comprising a composition for bonding and a solder wire,
wherein the composition for bonding comprises an epoxy resin, a reducing agent, and a curing agent,
as the epoxy resin chemically reacts with the reducing agent and the curing agent, the composition for bonding is cured, and
wherein the solder wire comprises a first end and a second end,
the first end and the second end meet together to define a bonding portion, and
the composition for bonding comprises a partially-cured body provided on the bonding portion to bond the first and second ends to each other.

2. The wire of claim 1, wherein the composition for bonding further comprises at least one of a thermoplastic resin, a cationic initiator, an acrylic resin, and a radical initiator.

3. The wire of claim 1, further comprising solder powder.

4. The wire of claim 1, wherein the epoxy resin comprises a bisphenol type epoxy resin, a biphenyl type epoxy resin, a naphthene type epoxy resin, a fluorene type epoxy resin, an alicyclic epoxy resin, and a novolac epoxy resin.

5. The wire of claim 1, wherein the curing agent comprises at least one of an amine-based curing agent, an imidazole-based curing agent, a latent curing agent, a thiol-based curing agent, a phenol-based curing agent, and an acid anhydride-based curing agent.

6. The wire of claim 1, wherein the reducing agent comprises at least one of carboxylic acid and amino acid.

7. The wire of claim 1, wherein the composition for bonding is provided in the solder wire.

8. The wire of claim 1, wherein the partially cured body is exposed to an outside of the composition for bonding.

9. The wire of claim 8, wherein the solder wire is provided in the partially cured body.

10. The wire of claim 8, further comprising solder powder in the partially cured body.

11. The wire of claim 9, wherein the solder wire comprises a first wire and a second wire, and
the first wire and the second wire are linearly arranged to be parallel to each other.

12. The wire of claim 9, wherein the solder wire comprises a first wire and a second wire, and
the first wire and the second wire are adjacent to and twisted with each other.

13. A wire for electric bonding, comprising a composition for bonding and solder powder,
wherein the composition for bonding comprises an epoxy resin, a reducing agent, a curing agent and a partially-cured body exposed to an outside of the composition for bonding,
as the epoxy resin chemically reacts with the reducing agent and the curing agent, the composition for bonding is cured, and
wherein the solder powder is in the partially-cured body.

* * * * *